United States Patent
Lee et al.

(10) Patent No.: US 10,574,089 B2
(45) Date of Patent: Feb. 25, 2020

(54) ATTRACTOR FOR PMA WIRELESS CHARGING TYPE WIRELESS POWER RECEPTION MODULE AND MANUFACTURING METHOD THEREFOR, AND WIRELESS POWER RECEPTION MODULE HAVING SAME

(71) Applicant: AMOSENSE CO., LTD, Chungcheongnam-do (KR)

(72) Inventors: Chun Gul Lee, Gimpo-si (KR); Kil Jae Jang, Seongnam-si (KR); Dong Hoon Lee, Yongin-si (KR); Min Sik Jang, Incheon (KR); Ki Chul Kim, Incheon (KR); Jong Ho Park, Seoul (KR)

(73) Assignee: AMOSENSE CO., LTD., Chungcheongnam-do (KR)

( * ) Notice: Subject to any disclaimer, the term of this patent is extended or adjusted under 35 U.S.C. 154(b) by 364 days.

(21) Appl. No.: 15/538,613

(22) PCT Filed: Nov. 23, 2015

(86) PCT No.: PCT/KR2015/012576
§ 371 (c)(1),
(2) Date: Jun. 21, 2017

(87) PCT Pub. No.: WO2016/104959
PCT Pub. Date: Jun. 30, 2016

(65) Prior Publication Data
US 2017/0372837 A1 Dec. 28, 2017

(30) Foreign Application Priority Data

Dec. 22, 2014 (KR) .................. 10-2014-0186471
Feb. 5, 2015 (KR) .................. 10-2015-0018233
(Continued)

(51) Int. Cl.
*H02J 50/10* (2016.01)
*H01F 27/40* (2006.01)
(Continued)

(52) U.S. Cl.
CPC ................ *H02J 50/10* (2016.02); *H01F 3/10* (2013.01); *H01F 27/365* (2013.01);
(Continued)

(58) Field of Classification Search
CPC .......... H01F 38/14; H01F 3/10; H01F 27/365; H01F 27/402; H01F 2003/103; H02J 50/10; H02J 7/025; H02J 17/00; H02J 50/90
See application file for complete search history.

(56) References Cited

U.S. PATENT DOCUMENTS

| | | | |
|---|---|---|---|
| 2014/0239892 A1* | 8/2014 | Sawa | H01F 38/14 320/108 |
| 2015/0214749 A1* | 7/2015 | Park | G01R 33/07 307/104 |
| 2015/0326057 A1* | 11/2015 | Koyanagi | H01M 10/46 320/108 |

FOREIGN PATENT DOCUMENTS

| | | |
|---|---|---|
| JP | 07-097006 B2 | 10/1995 |
| JP | 2010-041906 A | 2/2010 |

(Continued)

OTHER PUBLICATIONS

International Search Authority/KIPO, International Search Report dated Apr. 22, 2016 in International Patent Application No. PCT/KR2015/012576 (with English translation), 4 pages.
(Continued)

*Primary Examiner* — Carlos Amaya
(74) *Attorney, Agent, or Firm* — Masuvalley & Partners

(57) ABSTRACT

Provided are an attractor for PMA wireless charging type wireless power reception module and a manufacturing
(Continued)

method thereof, and a wireless power reception module having the same. The attractor for PMA wireless charging type wireless power reception module according to an embodiment of the present invention comprises: a wireless power reception module; and a thin magnetic piece formed of a magnetic material having a saturation magnetic flux density of 0.5 tesla or more such that a change in the voltage value of a hall sensor of a certain value or more can be detected in both an aligned state when a wireless power transmission module is aligned and a non-aligned state when the wireless power reception module is not in line with the wireless power transmission module within a non-alignment region having a certain area including the aligned state.

17 Claims, 11 Drawing Sheets

(30) Foreign Application Priority Data

| Jul. 20, 2015 | (KR) | ........................ 10-2015-0102536 |
| Jul. 20, 2015 | (KR) | ........................ 10-2015-0102537 |
| Aug. 4, 2015 | (KR) | ........................ 10-2015-0110075 |

(51) Int. Cl.
| *H01F 3/10* | (2006.01) |
| *H01F 27/36* | (2006.01) |
| *H01F 38/14* | (2006.01) |
| *H02J 7/02* | (2016.01) |

(52) U.S. Cl.
CPC .......... *H01F 27/402* (2013.01); *H01F 38/14* (2013.01); *H02J 7/025* (2013.01); *H01F 2003/103* (2013.01)

(56) References Cited

FOREIGN PATENT DOCUMENTS

| JP | 2010-153461 A | 7/2010 |
| JP | 2014-036116 A | 2/2014 |
| JP | 2014-183469 A | 9/2014 |
| KR | 10-2005-0034177 A | 4/2005 |
| KR | 10-2012-0100217 A | 9/2012 |
| KR | 10-2013-0050633 A | 5/2013 |
| KR | 10-2013-0072181 A | 7/2013 |
| KR | 10-2013-0076067 A | 7/2013 |
| KR | 10-2014-0048722 A | 4/2014 |
| KR | 10-2014-0076778 A | 6/2014 |
| KR | 10-2014-0109336 A | 9/2014 |
| KR | 10-2014-0143119 A | 12/2014 |
| KR | 10-2015-0089754 A | 8/2015 |

OTHER PUBLICATIONS

Vishay, "Wireless Charging Receiving Coil/Shield with Attractor", IWAS-4832FF-50, Vishay Dale, Document No. 34311; Revision date Sep. 17, 2014, Document No. 91000; Revision date Oct. 2, 2012, www.vishay.com.

* cited by examiner

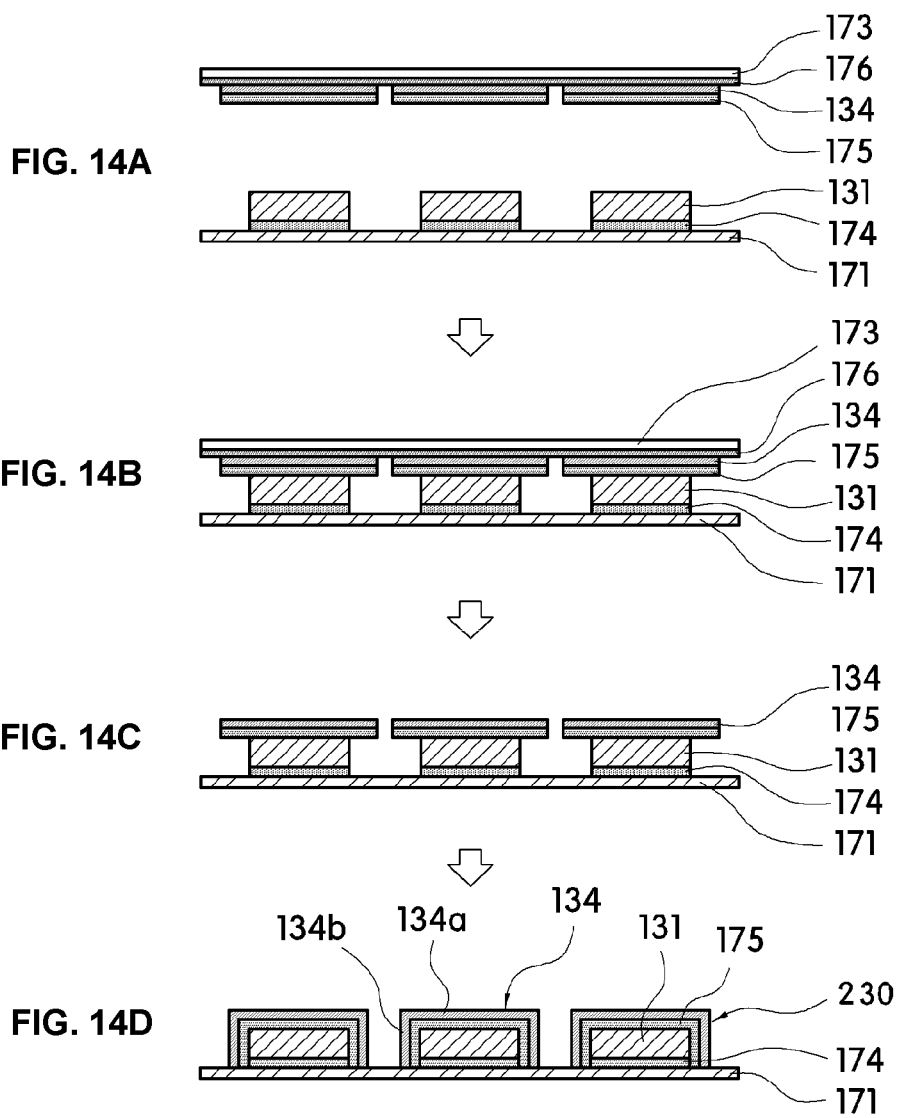

ATTRACTOR FOR PMA WIRELESS CHARGING TYPE WIRELESS POWER RECEPTION MODULE AND MANUFACTURING METHOD THEREFOR, AND WIRELESS POWER RECEPTION MODULE HAVING SAME

RELATED APPLICATIONS

This application is the U.S. National Phase of and claims priority to International Patent Application No. PCT/KR2015/012576, International Filing Date Nov. 23, 2015, entitled Attractor for PMA wireless charging type wireless power reception module and manufacturing method therefor, and wireless power reception module having same; which claims benefit of Korean Patent Application No. KR10-2014-0186471 filed Dec. 22, 2014, Korean Patent Application No. KR10-2015-0018233 filed Feb. 5, 2015, Korean Patent Application No. KR10-2015-0102536 filed Jul. 20, 2015, Korean Patent Application No. KR10-2015-0102537 filed Jul. 20, 2015 and Korean Patent Application No. KR10-2015-0110075 filed Aug. 4, 2015; which are incorporated herein by reference in their entireties.

TECHNICAL FIELD

The present invention relates to wireless charging of a portable terminal or the like, and more particularly, to an attractor for PMA wireless charging type wireless power reception module and a manufacturing method thereof, and a wireless power reception module including the same.

BACKGROUND ART

In recent years, a portable terminal has been provided with a wireless charging function for wirelessly charging a built-in battery, and this wireless charging is carried out by a wireless power reception module that is built in the portable terminal and a wireless power transmission module that supplies power to the wireless power reception module.

In addition, the wireless charging may be classified into a magnetic induction type and a magnetic resonance type, and also classified into a PMA wireless charging method and a Qi wireless charging method according to a method of detecting an approach of the wireless power reception module to the wireless power transmission module.

The PMA wireless charging method controls an operation of the wireless power transmission module by detecting the approach of the wireless power reception module using a permanent magnet and a hall sensor, and the concept of this is schematically shown in FIG. 1.

As shown in FIG. 1, a permanent magnet 14 and a hall sensor 12 are installed in a wireless power transmission module 10, and a magnetic substance so-called attractor 22 is installed at approximately the center portion of a wireless power reception module 20.

When the wireless power reception module 20 approaches the wireless power transmission module 10, a magnetic force line is generated from the permanent magnet 14, a difference of a voltage value in the hall sensor 12 is generated while a partial path of the magnetic force line is changed by the attractor 22, and when the difference of the voltage value exceeds a certain level, it is recognized that the wireless power reception module 20 approaches the wireless power transmission module 10, and the wireless power transmission module 10 is operated so that wireless charging is performed.

Meanwhile, in recent years, the thickness of the wireless power reception module 20 built in a portable terminal has been also reduced along with reductions in the weight, thickness and size of the portable terminal, and a problem that the thickness of the wireless power reception module 20 should be designed to be, for example, 0.5 mm or less or even 0.3 mm or less is generated. In this manner, when the thickness of the wireless power reception module is designed to be 0.5 mm or less or even 0.3 mm or less, it is difficult to increase the thickness of the attractor 22 to a predetermined thickness or more.

In addition, the attractor does not have a problem in exercising a function of detecting the difference of the operating voltage value in the hall sensor to be a predetermined value or more by changing the path of the magnetic force line of the permanent magnet 14, as the thickness or area of the attractor is increased, but cannot increase its size and thickness due to the limitations in the structure and shape of the wireless power reception module.

For example, when the attractor is configured to have a thickness of 200 μm or less, this has the following problem.

That is, in the PMA wireless charging method, the difference in the voltage value of the hall sensor should be detected to be approximately 50 mV (standard operating voltage value) or larger in order to detect the approach of the wireless power reception module. In addition, since it is difficult to accurately align the centers of the wireless power transmission and reception modules, it is necessary that the difference of the voltage value in the hall sensor should be detected as being approximately 50 mV or larger within a predetermined non-alignment region even when the centers of the wireless power transmission and reception modules are not aligned with each other.

However, when the attractor is configured to have a substantially small thickness, for example, 150 μm, the difference of the voltage value in the hall sensor is far below the standard operating voltage value (50 mV) in a state in which the centers of the wireless power transmission and reception modules are not aligned, and therefore the approach of the wireless power reception module is not detected so that wireless charging is not performed.

As an alternative to this, in Korean Patent Laid-Open Publication No. 10-2012-0100217, a technique for facilitating the alignment by disposing a fixing magnet and a fixing magnetic substance corresponding to each other respectively at sides of a charging receiver and a charging transmitter has been disclosed.

In addition, a plurality of sensing magnets in addition to the fixing magnetic substance are disposed at the charging receiver side, so that the hall sensor may detect a magnetic force of the sensing magnet even when the charging receiver is mounted at a different angle to the charging transmitter side.

However, in the above-described Patent, even when it is detected that the charging receiver is mounted at a different angle to the charging transmitter side through the plurality of sensing magnets, only mounting angles of the charging receiver and the charging transmitter are changed and the hall sensor is always located directly above the sensing magnet.

In other words, the hall sensor may detect the magnetic force of the sensing magnet only in an aligned state in which the hall sensor is located directly above the sensing magnet so that the charging transmitter may be operated, but when the hall sensor is located at a position other than a position directly above the sensing magnet, the charging transmitter may not be operated.

Meanwhile, the attractor is manufactured by a punching process, and the side surface of the attractor manufactured by the punching process constitutes a punched surface. At this time, when the attractor is made of a magnetic substance containing a metal component, when the punched surface is used for a product while it is exposed to the outside, the following problems are generated.

That is, when particles such as minute particles or powder particles are separated from the punched surface exposed to the outside, the particles separated from the punched surface also contain a metal component having conductivity, and therefore when the separated particles come into contact with an electronic circuit located around them, there arises a problem that the electronic circuit is shorted by the metal component.

In addition, in a salt water spray test process to test reliability of the attractor, a contact with moisture or the like on the punched surface that is an exposed surface may occur. Therefore, when penetration of moisture or the like into the punched surface occurs through the contact with moisture or the like, there also arises a problem that the exposed surface is oxidized.

DISCLOSURE

Technical Problem

As a result of repeated exemplary research and experiments, the present inventors have found that a saturation magnetic flux density of a magnetic substance constituting an attractor greatly influences the functioning of the attractor, and thus the present invention has been accomplished.

That is, it was found through the repeated research and experiments that, in a case in which the attractor is constituted of a magnetic substance whose saturation magnetic flux density is equal to or more than a certain level, for example, 0.5 tesla or more, with a significantly thin thickness, for example, 150 μm or less, when a center point of the attractor is located within a region corresponding to a permanent magnet provided in the wireless power transmission module even though the center of a wireless power transmission module and the center of a wireless power reception module are not aligned with each other, an operating voltage value required for a PMA wireless charging method can be stably detected.

The present invention is directed to providing an attractor in which, when using a magnetic substance whose saturation magnetic flux density is equal to or more than a certain level, for example, 0.5 tesla or more even though the attractor is configured with a significantly thin thickness of 150 μm or less, a stable operating voltage value required for a PMA wireless charging method may be detected even in a non-alignment region corresponding to a region corresponding to a permanent magnet, and therefore the attractor can be applied to a wireless power reception module of the PMA wireless charging method, specifically, a wireless power reception module designed to have a thickness of 0.5 mm or less or even 0.3 mm or less.

The present invention is also directed to providing an attractor for PMA wireless charging type wireless power reception module which may prevent particles or minute pieces from being separated from a side surface of the attractor exposed to the outside and prevent the side surface from being oxidized, and a manufacturing method thereof.

The present invention is also directed to providing a PMA wireless charging type wireless power reception module including the above-described attractor which may stably satisfy or implement all conditions and characteristics required for a PMA wireless charging method even while having a thickness of 0.5 mm or less or even 0.3 mm or less.

Technical Solution

One aspect of the present invention provides an attractor for PMA wireless charging type wireless power reception module according to the present invention, which is provided in a PMA wireless charging type wireless power reception module, changes a path of magnetic flux by inducing a part of a magnetic force line generated in a permanent magnet of a wireless power transmission module when the wireless power reception module approaches the wireless power transmission module, and induces a change in a voltage value in a hall sensor provided in the wireless power transmission module to satisfy an operation start condition of the wireless power transmission module.

At this time, the attractor according to the present invention may include a thin magnetic piece that includes a magnetic substance whose saturation magnetic flux density is 0.5 tesla or more so that an amount of the change in the voltage value of the hall sensor is detected to be a certain value or larger in an aligned state in which the wireless power reception module and the wireless power transmission module are aligned and even in a non-aligned state in which the wireless power reception module and the wireless power transmission module are not aligned within a non-alignment region with a predetermined area including the aligned state.

In addition, according to an embodiment of the present invention, the thin magnetic piece may include a minute piece separation preventing and oxidization preventing member so that particles or minute pieces are prevented from being separated from a side surface of the magnetic piece or the side surface is prevented from being oxidized.

The minute piece separation preventing and oxidization preventing member may be a protective film.

In addition, the minute piece separation preventing and oxidization preventing member may be a coating layer having adhesiveness.

Meanwhile, the present invention provides a PMA wireless charging type wireless power reception module including an attractor that is located between the antenna unit and the magnetic field shielding sheet, changes a path of magnetic flux by inducing a part of a magnetic force line generated in a permanent magnet of a wireless power transmission module when the wireless power reception module approaches the wireless power transmission module, and induces a change in a voltage value in a hall sensor provided in the wireless power transmission module to satisfy an operation start condition of the wireless power transmission module.

Another aspect of the present invention provides a manufacturing method of an attractor for PMA wireless charging type wireless power reception module including: forming a plate-shaped laminate by laminating a plurality of sheets via an adhesive layer, and attaching a carrier film to one surface of the laminate via an adhesive layer; primarily punching the laminate so that the laminate is separated into a plurality of magnetic pieces having a first area; attaching a plate-shaped film member for preventing minute piece separation and oxidization to completely cover the punched plurality of magnetic pieces; secondarily punching the plate-shaped film member so that the plate-shaped film member is separated into a plurality of protective films having a second area wider than the first area; and adhering the plurality of protective films and the plurality of magnetic pieces.

Still another aspect of the present invention provides a manufacturing method of an attractor for PMA wireless charging type wireless power reception module including: attaching, via an adhesive layer, a first carrier film to one surface of a plate-shaped laminate in which a plurality of sheets are laminated via an adhesive layer, and attaching a second carrier film to one surface of a plate-shaped film member for preventing minute piece separation and oxidization via an adhesive layer; punching the laminate attached to one surface of the first carrier film so that the laminated is separated into a plurality of magnetic pieces having a first area, and punching the plate-shaped film member attached to one surface of the second carrier film so that the film member is separated into a plurality of protective films having a second area equal to or larger than the first area; combining the plurality of protective films and the plurality of magnetic pieces so that the plurality of protective films individually cover one surfaces of the plurality of magnetic pieces; and adhering the plurality of protective films and the plurality of magnetic pieces.

Meanwhile, the present invention provides a wirelessly chargeable portable terminal which is characterized in that the above-described PMA wireless charging type wireless power reception module is installed in a rear case or a back cover of a main body of a portable terminal.

In addition, the present invention provides a PMA wireless charging type charging system including: a PMA wireless charging type wireless power reception module built in a portable terminal; and a wireless power transmission module that is operated to supply power to the wireless power reception module when the wireless power reception module approaches the wireless power transmission module within a predetermined distance or is brought into contact with the wireless power transmission module.

Advantageous Effects

According to an attractor according to the present invention, an attractor that changes a path of magnetic flux by inducing a part of a magnetic force line generated in a permanent magnet when the attractor approaches a wireless power transmission module may be provided with a thin magnetic piece having a significantly thin thickness of 150 µm or less using a magnetic substance having a saturation magnetic flux density of 0.5 tesla or more, for example, a ribbon sheet including at least one of an amorphous alloy and a nanocrystalline alloy or a silicon steel, so that it is possible to stably detect a difference of an operating voltage value required for detecting an approach of a wireless power reception module by satisfying an amount of change in a voltage value of a hall sensor which is required within a predetermined non-alignment region in addition to an alignment position at the time of the operation of the wireless power transmission module in a PMA wireless charging method even with the significantly thin thickness of 150 µm or less, and therefore there is no need to increase the overall thickness of the wireless power reception module and the wireless power reception module may be stably implemented in a state of satisfying all conditions and characteristics required for the wireless power reception module even when the wireless power reception module is designed to be formed into a thin plate having a thickness of, for example, 0.5 mm or less or even 0.3 mm or less.

In addition, according to an attractor of the present invention and a manufacturing method thereof, a minute piece separation preventing and oxidization preventing member may be provided on the side surface of the attractor that is exposed to the outside, and therefore oxidization caused by a contact with air and/or moisture may be prevented and particles or minute pieces may be prevented from being separated from the side surface of the attractor so that a short circuit of an internal circuit caused by the particles or minute pieces may be prevented.

In addition, according to a wireless power reception module of the present invention, an attractor that changes a path of magnetic flux by inducing a part of a magnetic force line generated from a permanent magnet when the wireless power reception module approaches a wireless power transmission module may be provided with a thin magnetic piece formed of a magnetic substance whose saturation magnetic flux density is 0.5 tesla or more and has a significantly thin thickness of 150 µm or less, so that a wireless power reception module that satisfies all conditions and characteristics required for a PMA wireless charging method may be implemented without any other structural changes even in a condition in which the overall thickness of the wireless power reception module is designed to have a thickness of 0.5 mm or less or even 0.3 mm or less, and therefore the wireless power reception module may be stably and efficiently applied to a portable terminal which is reduced in its weight, thickness and size.

DESCRIPTION OF DRAWINGS

FIG. 5A is a view illustrating a case in which a protective film is provided on an upper surface and side surface of a magnetic piece, and FIG. 5B is a view illustrating a case in which a protective film is provided only on a side surface of a magnetic piece.

FIG. 7A is a view illustrating a case in which the laminated structure is constituted of only amorphous ribbon layers, and FIG. 7B is a view illustrating a case in which the laminated structure is constituted of amorphous ribbon layers and ferrite layers.

FIGS. 12 to 14 are flowcharts illustrating another manufacturing method of an attractor according to the present invention in a case in which a protective film is provided in a thin magnetic piece, FIG. 12 is a flowchart illustrating a process of punching a plate-like laminate so that a plate-like laminate is separated into a plurality of magnetic pieces, FIG. 13 is a flowchart illustrating a process of punching a plate-like film member so that a plate-like film is separated into a plurality of protective films, FIG. 14 is a flowchart illustrating a process of manufacturing a final attractor by combining the magnetic pieces and protective films individually separated through the processes of FIGS. 12 and 13 with each other.

MODES OF THE INVENTION

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention. In the accompanying drawings, portions irrelevant to a description of the exemplary embodiments will be omitted for clarity. Like numbers refer to like elements throughout the description of the figures.

Figure 8:
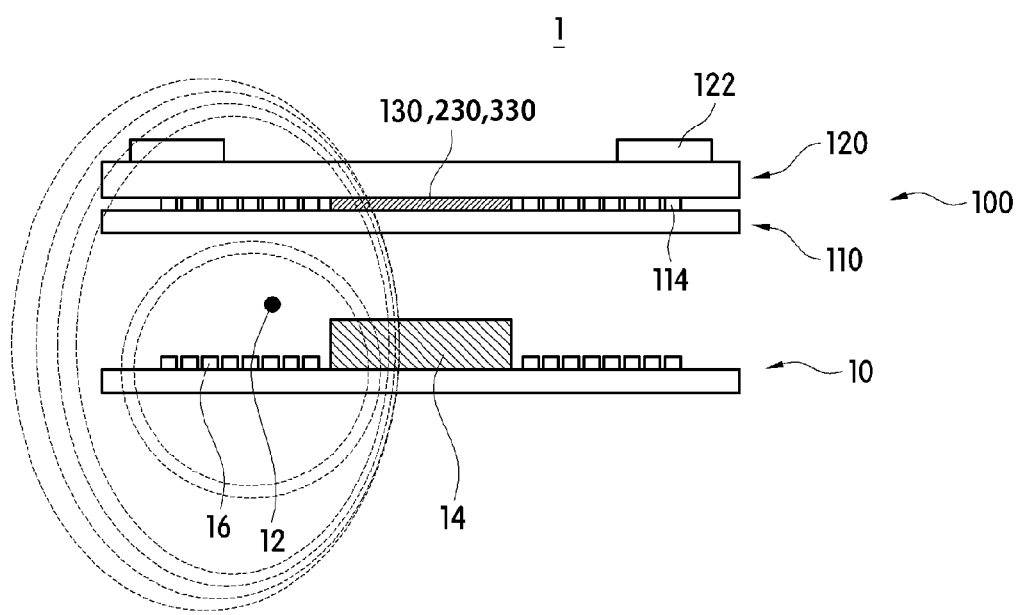
FIG. 8 is a schematic view corresponding to FIG. 1 for explaining the concept that detects an approach of a wireless power reception module to a wireless power transmission module in a PMA wireless charging type charging system adopting a wireless power reception module according to an embodiment of the present invention.
Figure 10:
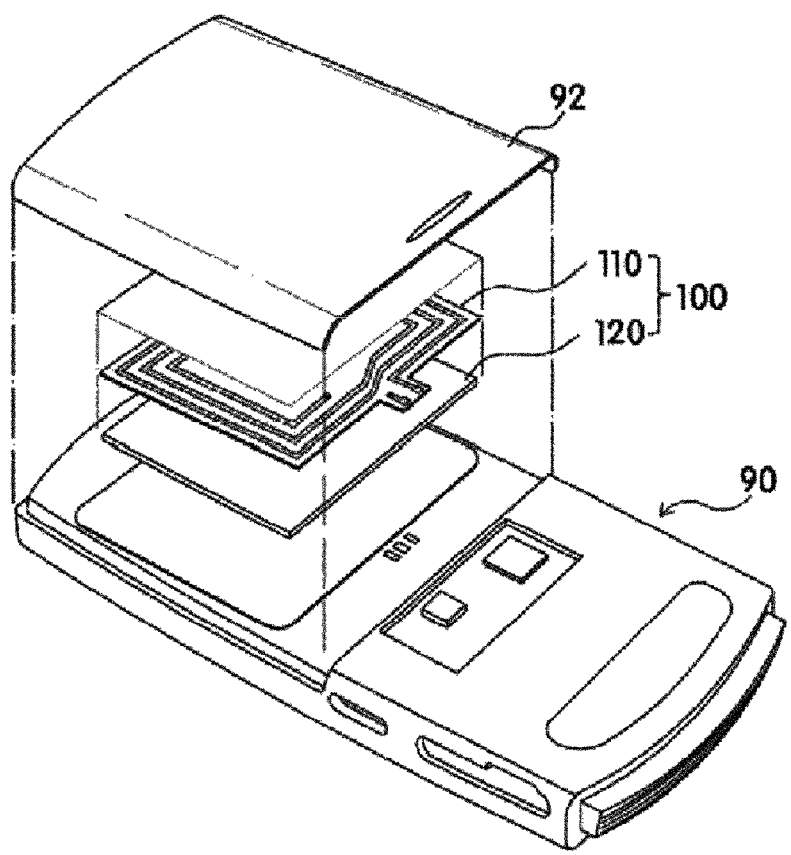
FIG. 10 is an exemplary view illustrating a state in which a PMA wireless charging type wireless power reception module according to an embodiment of the present invention is built in a portable terminal.

First, referring to FIG. 8, a PMA wireless charging type charging system 1 includes a wireless power transmission module 10, a wireless power reception module 100, and the like. The wireless power reception module 100 is built in a portable terminal 90 such as a smart phone or the like to be electrically connected to a battery, and the wireless power transmission module 10 is provided in a state of being built in a separate case or the like which is not shown, as shown in FIG. 10. When the wireless power reception module 100 approaches the wireless power transmission module 10, the wireless power transmission module 10 is operated to wirelessly supply power to the wireless power reception module 100. The wireless power reception module 100 charges a built-in battery of the portable terminal 90 with the supplied power. Reference numerals 12 and 14 in FIG. 8 are a hall sensor and a permanent magnet which constitute a device for detecting an approach of the wireless power reception module 100, and reference numeral 16 is a transmission wireless charging antenna pattern.

Figure 1:
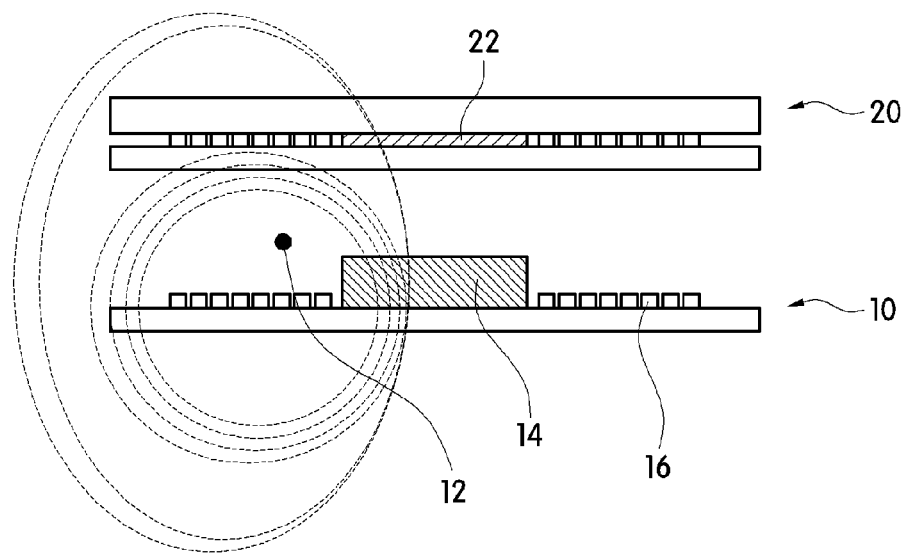
FIG. 1 is a view for explaining a concept that detects an approach of a wireless power reception module to a wireless power transmission module in a general PMA wireless charging type charging system.
Figure 2:
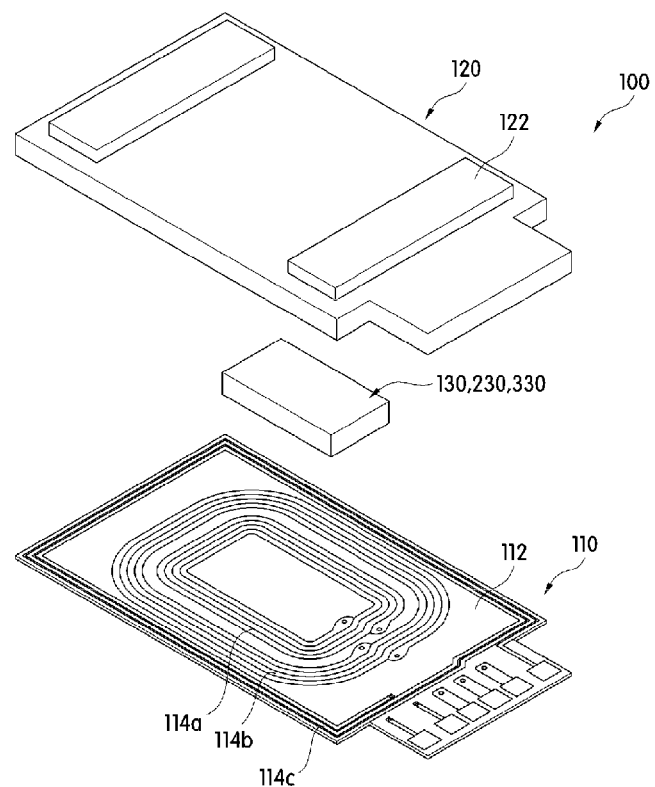
FIG. 2 is a schematic view illustrating an attractor according to the present invention and a PMA wireless charging type wireless power reception module having the attractor.
Figure 3:
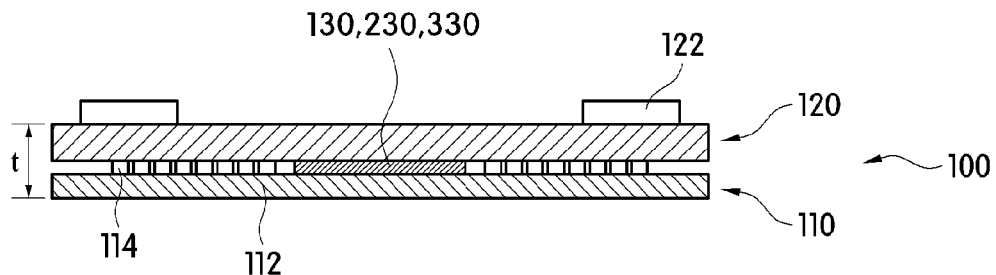
FIG. 3 is a cross-sectional view of FIG. 2.

As illustrated in FIGS. 2 and 3, the PMA wireless charging type wireless power reception module 100 according to an embodiment of the present invention includes an antenna unit 110, a shielding sheet 120, an attractor 130, 230, or 330, and the like.

The antenna unit 110 includes at least one antenna that performs a predetermined function by transmitting and receiving a wireless signal to and from a portable electronic device such as a mobile phone, a PDA, a PMP, a tablet, a multimedia device, or the like.

Here, the antenna may be composed of only a circular, elliptical, or rectangular flat coil which is wound clockwise or counterclockwise, but is not limited thereto. As shown in FIG. 2, the antenna may be formed such that a conductor such as a copper foil is patterned in the form of a loop on at least one surface of a flexible circuit board made of a synthetic resin such as polyimide (PI) or PET, or formed in a loop shape on a circuit board using conductive ink.

At this time, when the antenna is formed in a metal pattern on a circuit board, the metal pattern may be formed on one surface or both surfaces of the circuit board. In addition, the metal pattern is provided on an upper surface of the circuit board in the drawing, but is not limited thereto. For example, the metal pattern may be formed on a lower surface of the circuit board, or formed on both the upper and lower surfaces of the circuit board.

The antenna unit 110 is used to transmit power using an induction coupling method based on an electromagnetic induction phenomenon through a received wireless power signal, and may be constituted of an antenna 114a serving as a reception coil (Rx coil) for receiving wireless power and another antenna to be described below together.

That is, the antenna may be provided with a plurality of flat coils for performing different roles such as wireless power transmission, near field communication, magnetic security payment, and the like, or provided in a combo type in which at least two of a wireless power transmission antenna pattern 114a, a magnetic secure transmission (MST) antenna pattern 114b, and a near field communication (NFC) antenna pattern 114c are patterned on a circuit board 112.

Here, the NFC antenna pattern 114c has a higher frequency band than that of the wireless power transmission antenna pattern 114a so that it may be formed in a conductive pattern in a rectangular shape with a minute line width along the periphery of a substrate 112, and the wireless power transmission antenna pattern 114a requires power transmission and uses a lower frequency band than that of NFC so that it may be formed with a line width wider than a line width of the NFC antenna pattern 114c inside the NFC antenna pattern 114c. However, the positions of the NFC antenna pattern 114c and the wireless power transmission antenna pattern 114a are not limited thereto, and an arrangement relation therebetween may be appropriately changed depending on a design condition.

Meanwhile, the substrate 112 is an element that is a base substance in which at least one of the antenna patterns 114a, 114b, and 114c and a circuit unit are formed on an upper surface thereof has a heat resistant property and a pressure resistant property, and has flexibility. Considering physical properties of this element, a polyimide film that is a thermosetting polymer film may be employed as the substrate 112.

The shielding sheet 120 may include a plate-like member having a predetermined area, and shields a magnetic field generated by the wireless signal generated from the antenna unit 110 to prevent an external leakage and converge the magnetic field in a designated direction.

The shielding sheet 120 may be formed in a structure in which a plurality of thin magnetic sheets are provided and laminated in a plurality of layers.

Here, as the thin magnetic sheet, a thin ribbon sheet 121a including at least one of an amorphous alloy and a nanocrystalline alloy or a ferrite sheet 121b may be used.

Figure 7A:
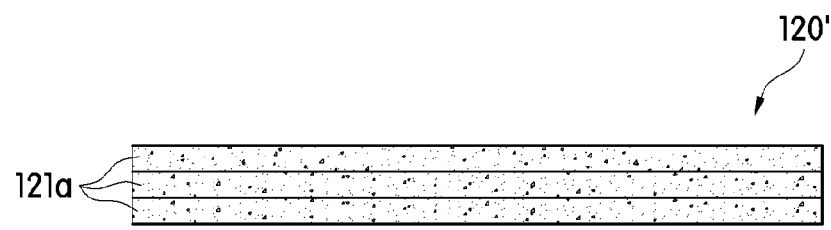
FIGS. 7A and 7B are an enlarged cross-sectional view schematically illustrating a laminated structure of a magnetic field shielding sheet according to an embodiment of the present invention.
Figure 7B:
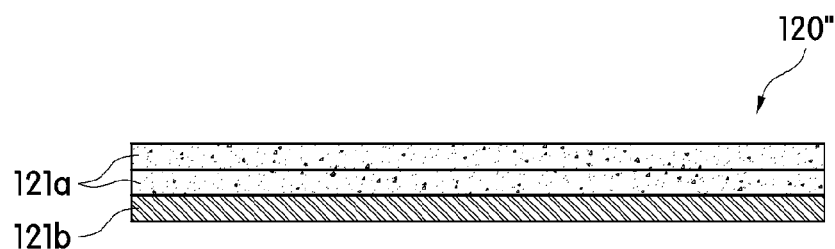

That is, the shielding sheet 120 may be a shielding sheet 120' constituted of only the thin ribbon sheet 121a including at least one of an amorphous alloy and a nanocrystalline alloy as shown in FIG. 7A, or may be a shielding sheet 120" in which one ferrite sheet 121b and two thin ribbon sheets 121a including at least one of an amorphous alloy and a nanocrystalline alloy are laminated as shown in FIG. 7B.

Here, a Fe-based or Co-based magnetic alloy may be used as the amorphous alloy, and the ferrite sheet 121b may include a sintered ferrite sheet such as a Mn—Zn ferrite or a Ni—Zn ferrite.

However, the thin magnetic sheet is not limited to the above-mentioned types, and any material having magnetic properties may be used as the thin magnetic sheet.

The shielding sheet 120 may fix the antenna unit 110 disposed on one surface of the shielding sheet 120 via an adhesive layer. Here, the adhesive layer may be a bond, PVC, rubber, a double-sided tape, or the like having adhesive properties, or include components having conductivity. Meanwhile, although not shown, the antenna unit includes a separate base substance such as PI or PET, and the base substance and the shielding sheet may be attached to each other.

Meanwhile, the attractor 130, 230, or 330 that changes a path of magnetic flux by inducing a part of a magnetic force line generated from a permanent magnet of the wireless power transmission module 10 when the wireless power reception module 100 approaches the wireless power transmission module 10 and induces a change in a voltage value in the hall sensor 12 so as to satisfy an operation start condition of the wireless power transmission module 10 is provided on one surface of the shielding sheet 120.

This attractor 130, 230, or 330 is disposed at a position corresponding to a central space portion of the antenna unit 110, and includes a thin magnetic piece 131 such as a plate-like sheet or film member. Preferably, the thin magnetic piece 131 may be formed to have the same size as that of the central space portion of the antenna pattern 114a so that a maximum area may be ensured from an allowed size of the wireless power reception module 100 to obtain high efficiency.

Here, the attractor 130, 230, or 330 may be attached to one surface of the shielding sheet 120 to be provided as a shielding unit integrated with the shielding sheet 120, or may be attached to one surface of the antenna unit 110 to be provided in the form integrated with the antenna unit 110. Thereby, the attractor 130 may be integrated with the shielding sheet 120 or the antenna unit 110 to be configured as one part, so that it is possible to manufacture the wireless power reception module 100 in a simplified process when the shielding sheet 120 and the antenna unit 110 are combined to each other, thereby inducing a reduction in manufacturing costs by simplifying an assembly process.

Meanwhile, the attractor 130 according to an embodiment of the present invention may include a thin magnetic piece 131 formed of a magnetic substance whose saturation magnetic flux density B is 0.5 tesla or more so as to satisfy a condition in which the overall thickness of the wireless power reception module 100 is designed to be 0.5 mm or less or even 0.3 mm or less and a condition in which an amount of change in a voltage value of the hall sensor is set to be a certain value or larger, for example, 50 mV or larger.

At this time, the thin magnetic piece 131 may be provided to have magnetic permeability of 100 to 1000, preferably magnetic permeability of 900.

For example, for the magnetic substance, a thin magnetic piece made of silicon steel (FeSi) or a thin ribbon sheet 131a including at least one of an amorphous alloy and a nanocrystalline alloy may be used. Here, a Fe-based or Co-based magnetic alloy may be used as the amorphous alloy.

At this time, when the thin magnetic piece 131 includes the thin ribbon sheet 131a including at least one of an amorphous alloy and a nanocrystalline alloy, it may include a single layer of a thin ribbon sheet 131a including at least one of an amorphous alloy and a nanocrystalline alloy, but may include multiple layers of a plurality of thin ribbon sheets 131a including at least one of an amorphous alloy and a nanocrystalline alloy. Preferably, the thin magnetic piece 131 may include three or more layers of thin ribbon sheets including at least one of an amorphous alloy and a nanocrystalline alloy. For example, the ribbon sheet may be composed of five or seven layers.

Here, when the thin magnetic piece 131 includes the multiple layers of thin ribbon sheets including at least one of an amorphous alloy and a nanocrystalline alloy, a bonding member 131b may be interposed between the respective ribbon sheets to integrate the multiple layers of ribbon sheets 131a.

At this time, the bonding member 131b may include a nonconductive component, and may be provided as an adhesive or in a form in which an adhesive is applied to one surface or both surfaces of a substrate provided in a film form.

Meanwhile, the thin magnetic piece 131 may be subject to a flake process to be divided into a plurality of minute pieces so that the overall resistance is increased to reduce generation of eddy current, and the neighboring plurality of minute pieces may be totally insulated or partially insulated from each other. Each of the plurality of minute pieces may be randomly formed in an irregular shape.

For example, when the thin magnetic piece 131 includes the thin ribbon sheet 131a including at least one of an amorphous alloy and a nanocrystalline alloy, the ribbon sheet 131a is subjected to a flaking process after heat treatment and separated into a plurality of minute pieces, and the neighboring plurality of minute pieces may be totally insulated or partially insulated from each other. At this time, each of the plurality of minute pieces may have a size of 1 μm to 3 mm, and randomly formed in an irregular shape.

Figure 4:
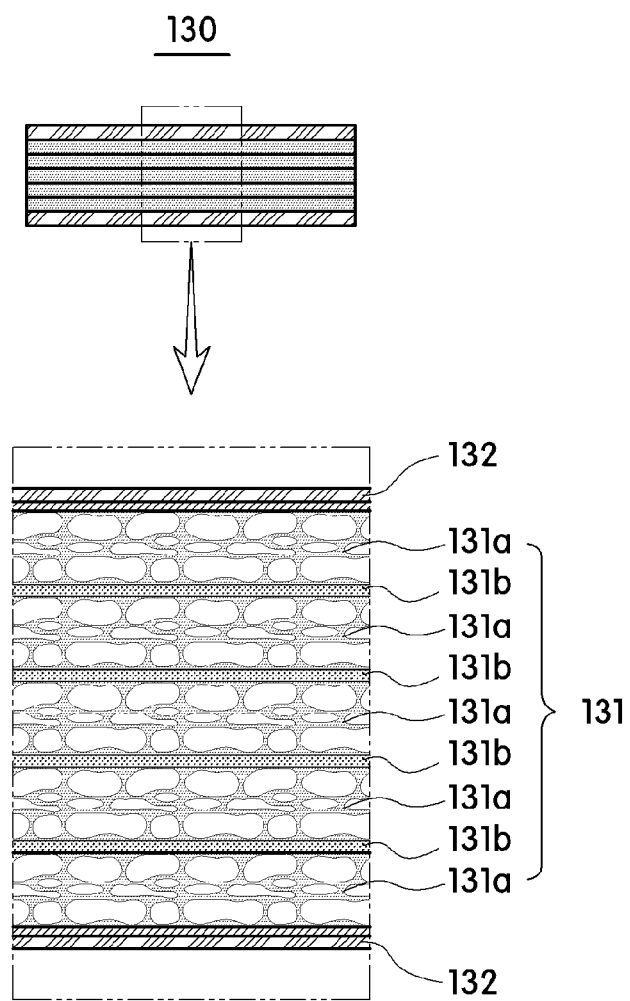
FIG. 4 is a cross-sectional view illustrating detailed configuration of an attractor according to the present invention and an attractor applied to a PMA wireless charging type wireless power reception module having the attractor according to the present invention.

That is, when the thin magnetic piece 131 is formed such that a plurality of ribbon sheets 131a separated into a plurality of minute pieces are composed of multiple layers as shown in FIG. 4, the respective ribbon sheets 131a may be integrated into multiple layers via the bonding member 131b. At this time, the bonding member 131b may include a nonconductive component. Thereby, at least a part of the bonding member 131b penetrates into gaps of the plurality of minute pieces constituting each ribbon sheet 131a so that the neighboring plurality of minute pieces may be totally or partially insulated from each other.

However, the kind of the magnetic substance constituting the thin magnetic piece 131 is not limited thereto, and any magnetic material such as ferrite, polymer, or permalloy may be used as the magnetic substance as long as its saturation magnetic flux density is 0.5 tesla or more. In addition, the thickness and magnetic permeability of the thin magnetic piece constituting the above-described attractor are not limited to the above-mentioned conditions, and the thin magnetic piece may have a variety of thicknesses and magnetic permeability depending on the design conditions.

In addition, the attractor 130, 230, or 330 may be include a removable release film 132 provided on at least one of an upper surface and a lower surface of the thin magnetic piece 131. The release film 132 may be attached to the thin magnetic piece 131 via an adhesive layer, and the adhesive layer may include a nonconductive component.

Meanwhile, the thin magnetic piece 131 may have a thickness of 50 μm to 200 μm. For example, the thin magnetic piece 131 may have a thickness of 100 μm to 150 μm.

Typically, in order to perform wireless charging through a PMA wireless charging method, a voltage value of the hall sensor 12 provided at the side of the wireless power transmission module 10 should be changed to a certain value or larger, for example, 50 mV or larger when the wireless power reception module 100 approaches the wireless power transmission module 10.

That is, when the voltage value of the hall sensor 12 is changed to 50 mV or larger, it is recognized that the wireless power reception module 100 approaches the wireless power transmission module 10 so that the wireless power transmission module 10 is operated. In this manner, when the amount of change in the voltage value of the hall sensor satisfies the operation start condition of the wireless power transmission module 10, the wireless power transmission module 10 may be operated to cause a wireless signal to be transmitted from the wireless power transmission module 10 to the wireless power reception module 100 so that charging is performed.

At this time, even when a center point $O_1$ of the wireless power transmission module 10 and a center point $O_2$ of the wireless power reception module 100 are not accurately aligned with each other, wireless charging is required to be performed within a predetermined area.

That is, even when the center of the wireless power reception module 100 is located in a non-alignment region that is a region around the center of the wireless power transmission module 10, it is necessary that the wireless power transmission module 10 is operated so that wireless charging is performed. This is because it is difficult for a user to always accurately align the center point $O_1$ of the wireless power transmission module 10 and the center point $O_2$ of the wireless power reception module 100 with each other.

Thus, when the center point $O_2$ of the wireless power reception module 100 is located within a non-alignment region S with a predetermined area even though the center of the wireless power reception module 100 is not aligned with the center of the wireless power transmission module 10, it is necessary to recognize that the wireless power reception module 100 approaches the wireless power transmission module by changing the voltage value of the hall sensor to a certain value or larger, for example, 50 mV or larger, so that the wireless power transmission module 10 may be operated.

In order to satisfy the above-described condition, it is necessary to increase inductivity of a magnetic force line generated from the permanent magnet 14 by increasing the overall thickness of the attractor 130, 230, or 330, or it is necessary for the attractor 130, 230, or 330 to increase inductivity of the magnetic force line generated from the permanent magnet 14 by increasing the overall area of the attractor 130, 230, or 330.

However, the increasing of the overall area of the attractor 130, 230, or 330 should be limited because the overall size of the wireless power reception module 100 is fixed.

In addition, when the wireless power reception module 100 is applied to an electronic device such as a cellular phone, the overall thickness of the wireless power reception module 100 should be limited to meet a demand for reduction in the weight, thickness, and size of the electronic device. Thereby, the attractor that changes the path of magnetic flux generated from the permanent magnet should be limited in its overall thickness to be used.

In particular, in a case in which the total thickness of the wireless power reception module 100 is limited to 0.5 mm or less or even 0.3 mm or less, when the wireless power reception module 100 is located within a predetermined non-alignment region even though the attractor 130, 230, or 330 having a thin thickness of 50 μm to 200 μm is used, it is necessary to recognize that the wireless power reception module 100 approaches the wireless power transmission module by changing the voltage value of the hall sensor 12 to 50 mV or larger.

In the present invention, the attractor 130, 230, or 330 with a thin thickness of 50 μm to 200 μm may be used by increasing the number of magnetic force lines induced toward the attractor 130, 230, or 330 among magnetic force lines generated in the permanent magnet, using the magnetic substance whose saturation magnetic flux density is 0.5 tesla or more as the thin magnetic piece 131 constituting the attractor 130, 230, or 330. In addition, when the magnetic piece 131 is constituted using the magnetic substance whose saturation magnetic flux density is 0.5 tesla or more, the voltage value of the hall sensor 12 may be changed to a certain value, for example, 50 mV or larger even though the center point $O_2$ of the wireless power reception module 100 is located in a proximity region including the center point $O_1$ of the wireless power transmission module 10, that is, the non-alignment region S as well as an aligned state in which the center point $O_1$ of the wireless power transmission module 10 and the center point $O_2$ of the wireless power reception module 100 are aligned with each other.

Figure 9A:
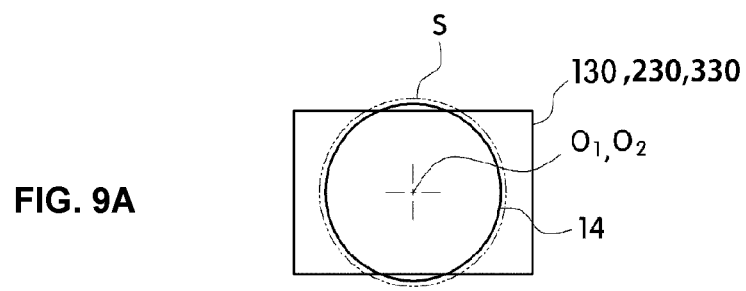
FIG. 9 is a schematic view illustrating a relationship between a center point of a permanent magnet and a center point of a thin magnetic piece for explaining an aligned state and a non-aligned state of a wireless power transmission module and a wireless power reception module in a PMA wireless charging type charging system adopting a wireless power reception module according to an embodiment of the present invention, a) is a view illustrating the aligned state, b) is a view illustrating a state in which the center point of the thin magnetic piece is located in a non-alignment region in the non-aligned state, and c) is a view illustrating a state in which the center point of the thin magnetic piece is deviated from the non-alignment region in the non-aligned state.

Here, the aligned state is a state (see FIG. 9A) in which the center point $O_2$ of the thin magnetic piece 131 constituting the attractor 130 is located directly above the center point $O_1$ of the permanent magnet 14 provided in the wireless power transmission module 10, and the non-aligned state is a state (see FIGS. 9B and 9C) in which the center point $O_2$ of the thin magnetic piece 131 is not located directly above the center point $O_1$ of the permanent magnet 14 while it is located in an upper part of the non-alignment region S.

At this time, the non-alignment region S may be an inner region corresponding to a cross-sectional area of the permanent magnet with respect to the center point of the permanent magnet provided in the wireless power transmission module 10. That is, the non-alignment region S may be an area including the remaining region except for a portion directly above the center point $O_1$ of the permanent magnet 14 in which the center point $O_2$ of the thin magnetic piece 131 constituting the attractor 130 is located in line with the center point of the permanent magnet 14 while it is located in the region corresponding to the cross-sectional area of the permanent magnet 14.

For example, when the diameter of the permanent magnet 14 is 15.5 mm, the non-alignment region S may be an area corresponding to a region within a radius of 8 mm with respect to the center point of the permanent magnet 14. However, the non-alignment region S is not limited thereto, and it may be also increased along with an increase in the diameter or cross-sectional area of the permanent magnet 14.

For example, in a case in which an initial voltage value of the hall sensor 12 is 850 mV, a voltage value of the hall sensor 12 is changed to approximately 220 mV at the time of an approach or contact of the wireless power reception module 100 and the wireless power transmission module 10 even though the thin magnetic substance made of silicon steel having a significantly thin thickness of 150 μm and a saturation magnetic flux density of 0.5 tesla or more is used as the thin magnetic piece 131 constituting the attractor 130, 230, or 330, and therefore an amount of change in the voltage value of the hall sensor of 50 mV or larger that is an operation start condition of the wireless power transmission module 10 for wireless charging may be satisfied so that the wireless power transmission module 10 may be operated. Thereby, the hall sensor may detect a stable operating voltage value required in a PMA wireless charging method while the overall thickness of the wireless power reception module 100 is 0.5 mm or less or even 0.3 mm or less (see FIG. 9A).

Figure 9B:
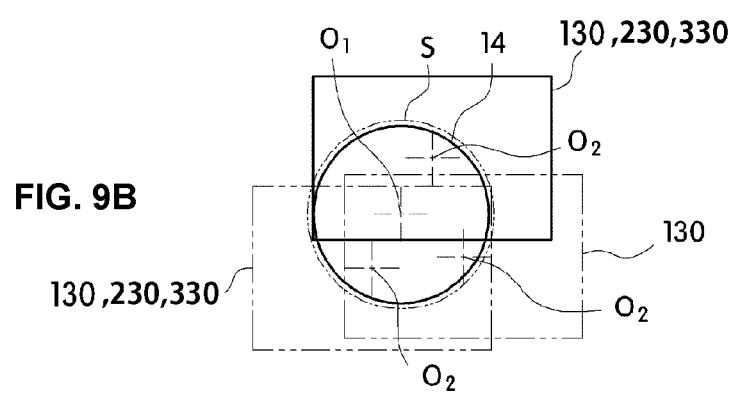
Figure 9C:
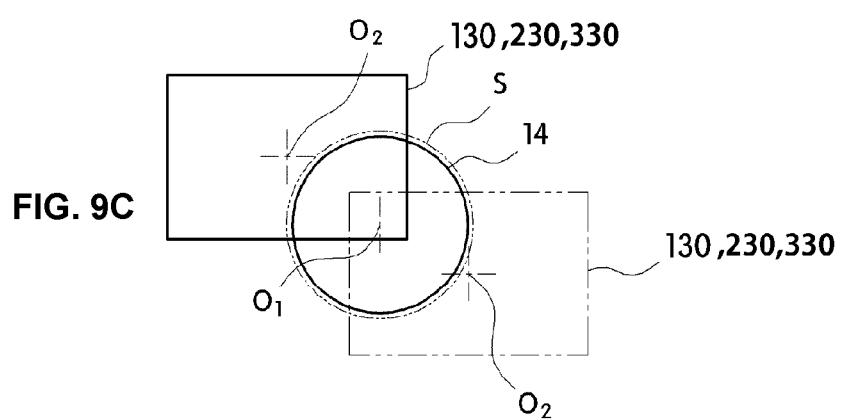

In addition, in a case in which the initial voltage value of the hall sensor 12 is 850 mV, when the thin magnetic substance made of silicon steel having a significantly thin thickness of 150 μm and a saturation magnetic flux density of 0.5 tesla or more is used as the thin magnetic piece 131 constituting the attractor 130, 230, or 330, the voltage value of the hall sensor 12 may be changed to approximately 220 mV even though the wireless power reception module 100 is located in a peripheral region in which the center point of the thin magnetic piece 131 and the center point of the permanent magnet 14 are not aligned with each other, that is, the non-alignment region S, and therefore an amount of change in the voltage value of the hall sensor of 50 mV or larger that is the operation start condition of the wireless power transmission module 10 for wireless charging may be satisfied so that the wireless power transmission module 10 may be operated (see FIG. 9B).

Thereby, wireless charging may be performed within the non-alignment region S having a predetermined area even when a user does not accurately align the center point of the wireless power reception module 100 and the center point of the wireless power transmission module 10, so that the ease of use may be improved.

In addition, in a case in which the initial voltage value of the hall sensor 12 is 850 mV, when the wireless power reception module 100 is located within the non-alignment region as well as the alignment region at the time of an approach or contact of the wireless power reception module 100 and the wireless power transmission module 10 even though the thin magnetic substance formed of a ribbon sheet including at least one of an amorphous alloy and a nanocrystalline alloy having a thickness of 100 μm and a saturation magnetic flux density of approximately 1.56 tesla is used as the thin magnetic piece 131 constituting the attractor 130, 230, or 330, the voltage value of the hall sensor 12 may be changed to approximately 220 mV, and therefore an amount of change in the voltage value of the hall sensor of 50 mV or larger that is the operation start condition of the wireless power transmission module 10 for wireless charging may be satisfied so that the wireless power transmission module 10 may be operated.

That is, when the thin magnetic piece includes a ribbon sheet including at least one of an amorphous alloy and a nanocrystalline alloy having a relatively higher saturation magnetic flux density than that of silicon steel, the amount of change in the voltage value of the hall sensor of 50 mV or larger that is the operation start condition of the wireless power transmission module 10 may be satisfied even within the non-alignment region as well as the alignment region even though the magnetic piece has a relatively thinner thickness of 100 μm compared to when the thin magnetic piece is made of silicon steel, so that the wireless power transmission module 10 may be operated. Thereby, the thickness of the attractor may be made thinner, thereby further reducing the overall thickness of the wireless power reception module.

In addition, when the thin magnetic piece 131 includes the ribbon sheet including at least one of an amorphous alloy and a nanocrystalline alloy which is subjected to a flaking process after heat treatment and separated into a plurality of minute pieces, the occurrence of an eddy current may be reduced by increasing the overall resistance, so that the problem of heat generation due to the eddy current may be solved at the same time.

Here, the overall thickness t of the wireless power reception module may be a laminated height of the antenna unit 110, the attractor 130, and the shielding sheet 120, and when a heat radiating sheet 122 such as graphite is provided on an upper surface of the shielding sheet 120, the overall thickness t may be a thickness including the heat radiating sheet 122.

Meanwhile, the attractor 230 or 330 according to the present invention may include a minute piece separation preventing and oxidization preventing member 134 or 234 that covers at least a part of the thin magnetic piece 131 so that particles or minute pieces may be prevented from being separated from the side surface of the thin magnetic piece 131, and prevent a side surface of the thin magnetic piece 131 from being exposed to the outside and prevent oxidization of the side surface.

That is, when the thin magnetic piece 131 includes a magnetic substance including a metal component such as permalloy or a ribbon sheet including at least one of an amorphous alloy and a nanocrystalline alloy, the side surface of the magnetic piece 131 may be a punched surface that is formed in a process of manufacturing the attractor. Thereby, when minute pieces or particles such as ribbon pieces are separated from the punched surface, the separated minute pieces or particles may cause the occurrence of a short circuit in an electronic circuit.

In the present invention, the minute piece separation preventing and oxidization preventing member 134 or 234 may be provided to surround the side surface of the magnetic piece 131 corresponding to the punched surface, so that minute particles may be prevented from being separated from the side surface of the magnetic piece 131 that is the punched surface by the minute piece separation preventing and oxidization preventing member 134 or 234.

Thereby, even when the thin magnetic piece 131 constituting the attractor 230 or 330 includes the magnetic substance including metal components, minute pieces or particles may be prevented from being separated from the side surface that is the punched surface, and prevented from being oxidized due to a contact with air and/or moisture, so that the product reliability may be enhanced and the occurrence of a short circuit in the electronic circuit caused by the separated minute pieces or particles may be prevented.

Figure 5A:
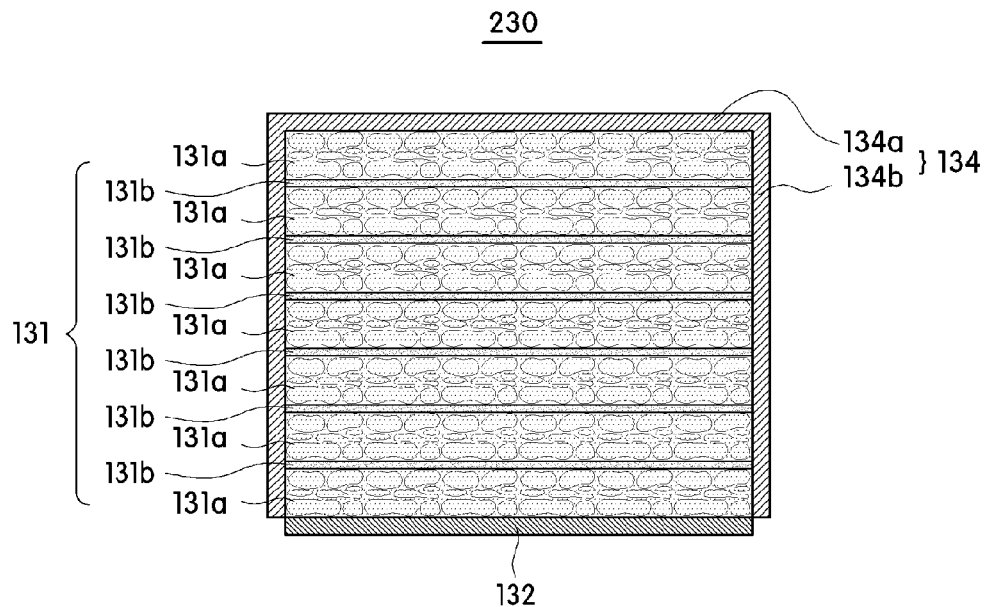
FIGS. 5A and 5B are cross-sectional views illustrating detailed configuration of another type of the attractor according to the present invention.
Figure 5B:
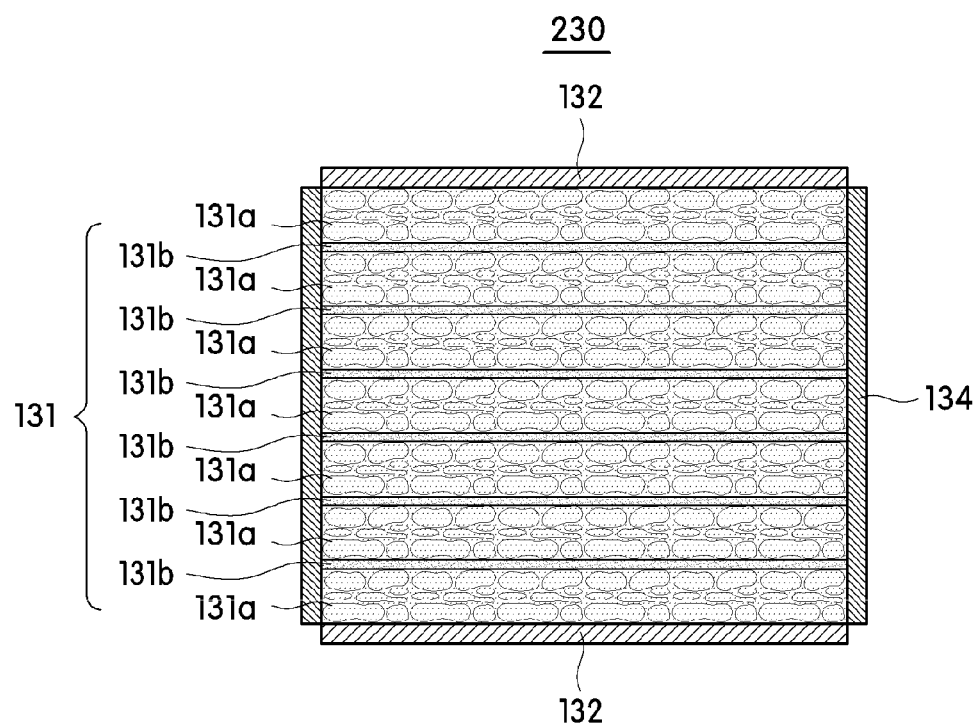
Figure 6:
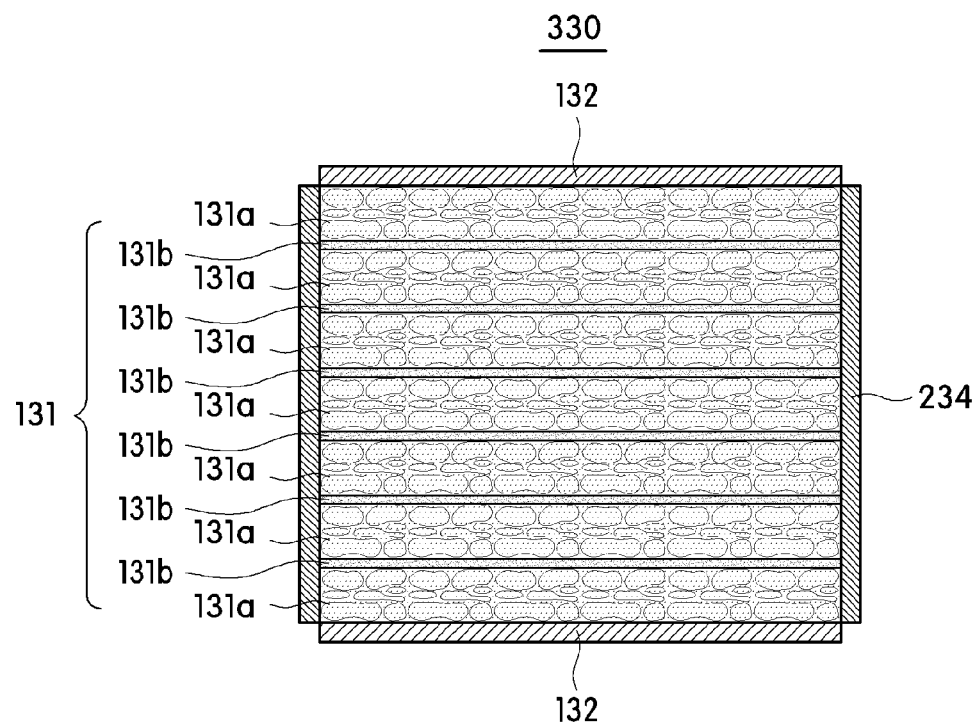
FIG. 6 is a cross-sectional view illustrating detailed configuration of still another type of attractor according to the present invention.

To this end, the minute piece separation preventing and oxidization preventing member 134 or 234 may be provided in the form of a protective film that covers the side surface of the magnetic piece 131 as shown in FIGS. 5 and 6, or provided as a coating layer applied with a predetermined thickness.

That is, the minute piece separation preventing and oxidization preventing member 134 may be attached to the magnetic piece 131 via the adhesive layer as shown in FIGS. 5A and 5B so that at least the side surface of the magnetic piece 131 may be prevented from being exposed to the outside.

Here, the adhesive layer applied to one surface of the minute piece separation preventing and oxidization preventing member 134 may be provided with an adhesive including a nonconductive component so that the minute pieces separated from the side surface of the magnetic piece 131 may be kept adhered to the punched surface.

Meanwhile, when the minute piece separation preventing and oxidization preventing member 134 is provided in the form of a protective film, a fluorine resin-based film such as a polyethylene terephthalate (PET) film, a polypropylene (PP) film, or a polyester terephthalate (PTFE) film may be used as the protective film.

At this time, the minute piece separation preventing and oxidization preventing member 134 may be provided to cover only the side surface of the magnetic piece 131 (see FIG. 5B), or provided in the form including a second portion 134b that covers the side surface of the magnetic piece 131 and a first portion 134a that covers an upper surface of the magnetic piece 131 (see FIG. 5A).

Here, a portion of the minute piece separation preventing and oxidization preventing member 134 that covers the side surface of the magnetic piece 131 may be provided with a width that is 1 to 3 times greater than the overall thickness of the magnetic piece 131 so as to completely cover the side surface of the magnetic piece 131 that is an exposed surface, and preferably provided with a width that is 1 to 2.5 times greater than the overall thickness of the magnetic piece 131.

For example, when the magnetic piece 131 has a thickness of 150 µm, the second portion 134b may be provided with a width of 150 µm to 450 µm, and preferably provided with a width of 150 µm to 375 µm.

This is to enhance the reliability and mass productivity by allowing the second portion 134b to completely surround the side surface of the magnetic piece 131 even though an error occurs in the manufacturing process such as a punching process. When the second portion 134b has a smaller width than the thickness of the magnetic piece 131, it cannot completely cover the side surface of the magnetic piece 131, and when the second portion 134b has a width that is 3 times or more greater than the thickness of the magnetic piece 131, the adhesive strength may be lowered in a process of attaching the attractor 230 to the shielding sheet 120 and/or the antenna unit 110.

As another example, the minute piece separation preventing and oxidization preventing member 234 may be provided as a coating layer applied to the side surface of the thin magnetic piece 131 as shown in FIG. 6. At this time, a part of the coating layer may penetrate into the side surface of the magnetic piece 131.

Here, the coating layer may be provided with an adhesive including a nonconductive component so that the minute pieces or particles may be kept adhered to the punched surface, and may be a polymer resin including at least one selected from wax, an epoxy resin, a melamine resin, a silicone resin, an acrylic resin, an ethylene propylene rubber resin (EPDM), and a polyvinyl alcohol resin (PVA). In addition, the wax may be used as an additive for other polymer resins.

The coating layer may be formed such that the side surface of the magnetic piece 131 exposed to the outside may be coated with the coating material by dipping the thin magnetic piece 131 into a water tank containing a coating material or by spraying the coating material onto the thin magnetic piece 131 in a spraying method.

At this time, the side surface of the thin magnetic piece 131 is coated with the coating material to form the coating layer, and then a process of removing burrs agglomerated by surface tension at corners by bring a sponge contact with the upper and lower surfaces of the thin magnetic piece 131 may be performed.

Next, when the thin magnetic piece 131 with the coating layer formed on the side surface thereof is dried, the attractor 330 with the coating layer formed on the side surface of the magnetic piece 131 is completed.

Here, the attractor 330 may be dried in a natural drying method performed at room temperature or in a high temperature environment through heating. In addition, the drying may be performed a plurality of times.

In the drawing and description, when the minute piece separation preventing and oxidization preventing member 134 is provided in a film form, it is provided on the side surface and/or the upper surface of the magnetic piece 131, but the position of the minute piece separation preventing and oxidization preventing member 134 is not limited thereto, and when the punched surface or the exposed surface is the upper surface and/or lower surface of the thin magnetic piece 131, the minute piece separation preventing and oxidization preventing member may be provided on the upper surface and/or lower surface of the magnetic piece corresponding to the punched surface or the exposed surface.

Similarly, when the minute piece separation preventing and oxidization preventing member 234 is provided as the coating layer, the coating layer is provided on the side surface of the attractor 230, but the position of the coating layer is not limited thereto, and when the exposed surface is the upper surface and/or lower surface, the coating layer may be provided on the upper surface and/or lower surface corresponding to the exposed surface of the attractor. That is, the coating layer 234 may be applied to all exposed surfaces of the attractor which is exposed to the outside in a process of applying the attractor 230 to a product.

In this manner, the PMA wireless charging type wireless power reception module 100 according to an embodiment of the present invention may be installed inside a rear case or a back cover of the portable terminal 90 as shown in FIG. 10. In addition, the PMA wireless charging type wireless power reception module 100 according to an embodiment of the present invention may be applied to the PMA wireless charging type charging system 1 including the wireless power transmission module 10, the wireless power reception module 100, and the like as shown in FIG. 8.

Hereinafter, a manufacturing method of the attractor 230 for the PMA wireless charging type wireless power reception module according to an embodiment of the present invention will be described in detail with reference to FIG. 11.

First, a plurality of sheets 131a manufactured through heat treatment are prepared. Here, the plurality of sheets 131a may be a plurality of thin ribbon sheets including at least one of an amorphous alloy and a nanocrystalline alloy with high magnetic permeability. In addition, at least three ribbon sheets may be used, and preferably, seven ribbon sheets may be used.

Next, the plurality of ribbon sheets 131a and 130b are sequentially laminated to constitute a laminate A composed of multiple layers. At this time, the bonding member 131b is disposed between a pair of ribbon sheets 131a adjacent to each other so that the laminate may be integrated via the bonding member 131b.

Next, in order to suppress the occurrence of an eddy current, the laminate is allowed to pass through a flake device (not shown) so that the ribbon sheets constituting the laminate A may be separated into a plurality of minute pieces. Here, the separated plurality of minute pieces may be prevented from being released to the outside through release films 132 attached to the upper and lower surfaces of the laminate.

At this time, the adhesive layer 130b disposed between the adjacent ribbon sheets penetrates into the ribbon sheets, so that the plurality of minute pieces constituting each ribbon sheet may be totally or partially insulated from each other.

For example, the flake device may include a metal roller having a plurality of concavities and convexities formed on an outer surface thereof and a rubber roller disposed at one side of the metal roller, and the laminate may be separated into a plurality of pieces by the concavities and convexities while passing through the metal roller and the rubber roller. At this time, the laminate may pass through the flake device a plurality of times so that each of the plurality of minute pieces may have a size of 1 μm to 3 mm, and each of the plurality of minutes pieces may be formed in an irregular shape.

Here, the laminate A with the plurality of ribbon sheets laminated therein may be subjected to a hot pressing process for planarization and slimming. Thereby, the laminate A may be reduced in its overall thickness and maintained with a predetermined thickness thereof.

Figure 11A:
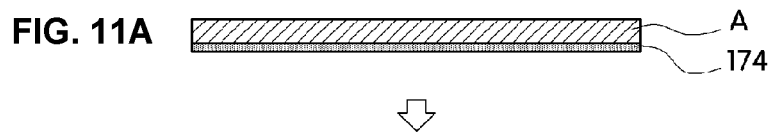
FIG. 11 is a flowchart illustrating a manufacturing method of an attractor according to the present invention in a case in which a protective film is provided in a thin magnetic piece.
Figure 11B:
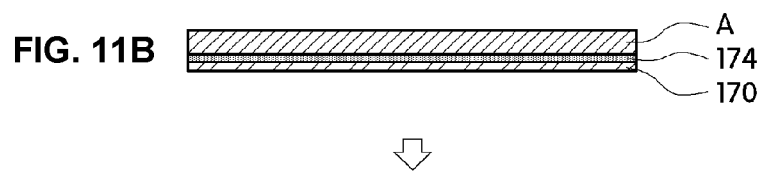
Figure 11C:
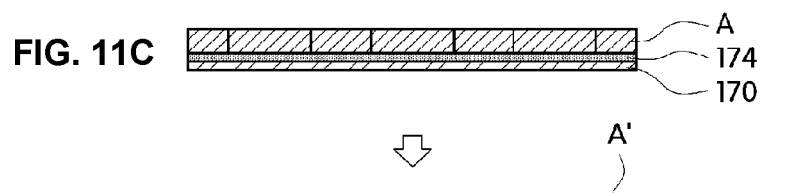
Figure 11D:
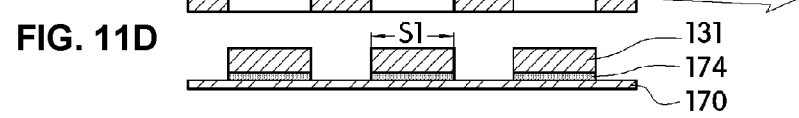
Figure 11D:
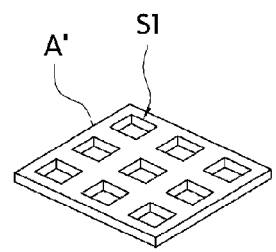

A plate-shaped laminate A with a predetermined width is prepared through the above-described process, and then a carrier film 170 is attached to one surface of the laminate A via an adhesive layer 174 (see FIGS. 11A and 11B). Next, the plate-shaped laminate A attached to one surface of the carrier film 170 is separated into a plurality of magnetic pieces 131 through a punching process (see FIG. 11C), and a remaining portion A' except for the plurality of magnetic pieces 131 is removed from the carrier film 170 (see FIG. 11D).

Thereby, the separated plurality of magnetic pieces 131 each having a constant size with a predetermined area (hereinafter, referred to as a 'first area S1') remain on one surface of the carrier film 170 while they are arranged at regular intervals, so that the plurality of magnetic pieces 131 may maintain an aligned state by being kept attached to the carrier film 170 through the adhesive layer 174.

Here, when the release film 132 of FIG. 5B is attached to the uppermost side of the laminate A before punching the plate-shaped laminate A, the punching process may be performed after the release film is removed, or performed in a state in which the release film is attached.

Figure 11E:
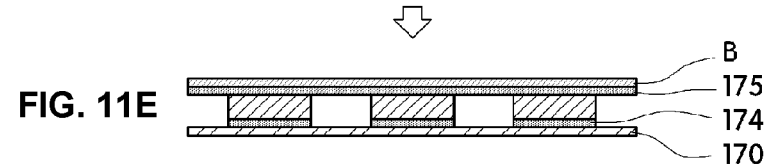
Figure 11E:
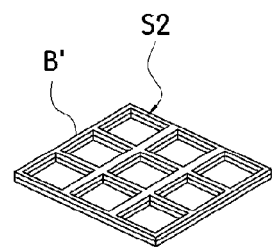

Next, a plate-shaped film member B is attached to the plurality of magnetic pieces 131 so as to simultaneously cover the plurality of magnetic pieces 131 separated from each other (see FIG. 11E). Here, the film member B is attached to the plurality of magnetic pieces 131 through an adhesive layer 175 applied to one surface of the film member B, and is separated into a plurality of protective films 134 through a punching process to cover the side surface of the magnetic piece 131 that is the punched surface, thereby preventing separation of minute pieces or particles and preventing oxidization.

Figure 11F:
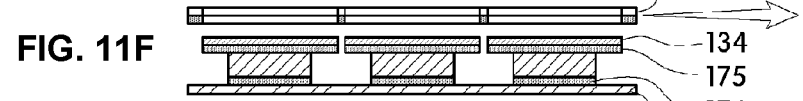

To this end, in a state in which the film member B is attached to the plurality of magnetic pieces 131 so as to simultaneously cover the plurality of magnetic pieces 131, the film member B is separated into the plurality of protective films 134 each having a constant size with a predetermined area (hereinafter, referred to as a 'second area S2'), and a remaining portion except for the plurality of protective films 134 is removed from the carrier film 170 (see FIG. 11F).

Here, the plurality of protective films 134 includes the above-described first portion 134a and second portion 134b, the first area S1 corresponds to an area of the first portion 134a, and the second area S2 corresponds to an area of the sum of the first portion 134a and the second portion 134b.

At this time, the plurality of protective films 134 are punched to have a wider area than that of the upper surface of the magnetic piece 131. That is, the second area S2 is provided to have a wider area than the first area S1, and a portion of the second area S2 that exceeds the first area S1 may be provided to have a width that is 1 to 3 times greater than the thickness of the magnetic piece 131, and preferably, to have a width that is 1 to 2.5 times greater than the thickness of the magnetic piece 131.

This is to enhance the reliability and mass productivity by allowing the portion of the second area S2 that exceeds the first area to completely surround the side surface of the magnetic piece 131 even though an error occurs in a manufacturing process such as a punching process.

Here, a fluorine resin-based film such as a PET film, a PP film, or a PTFE film may be used as the film member B.

Figure 11G:
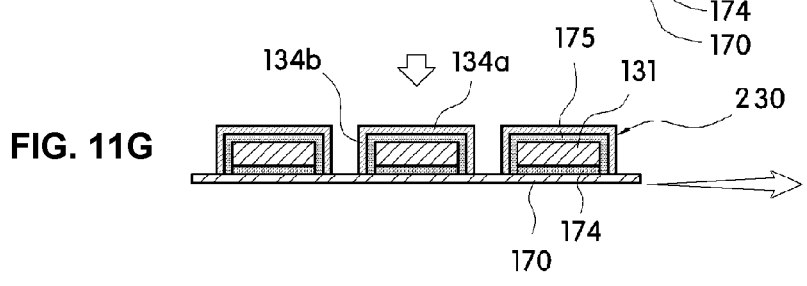
Figure 11G:
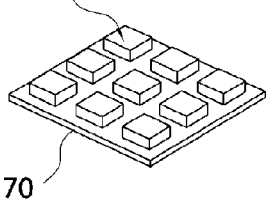

Finally, when the plurality of magnetic pieces 131 are attached to the one surface of the carrier film 170 and the carrier film 170 is pressed through a rolling process in a state in which the protective films 134 are respectively attached to the upper surfaces of the plurality of magnetic pieces 131, each of the protective films 134 is squeezed by a pressing force to surround the side surface of the magnetic piece 131, and a portion of the protective film 134 that exceeds the first area is completely adhered to the side surface of the magnetic piece 131 through the adhesive layer 175 so that the final attractor 130 is completed (see FIG. 11G).

Thereby, the side surface of the magnetic piece 131 that is the punched surface is prevented from being exposed to the outside to prevent the exposed surface from being oxidized and prevent particles such as ribbon pieces from being separated from the punched surface, so that the occurrence of a short circuit in the electronic circuit caused by the particles separated from the punched surface may be prevented.

Next, the attractor 230 is separated individually from the carrier film 170 during use, so that the attractor 230 may be applied to a product.

Meanwhile, another manufacturing method of the attractor 230 for the PMA wireless charging type wireless power reception module according to an embodiment of the present invention is shown in FIGS. 12 to 14.

That is, according to another manufacturing method of the attractor 230 for the PMA wireless charging type wireless power reception module according to an embodiment of the present invention, a punching process for forming the plurality of magnetic pieces 131 and a punching process for configuring the plurality of protective films 134 are separately performed, and then the plurality of magnetic pieces 131 and protective films 134 on which punching process has been performed are combined with each other, unlike the above-described manufacturing method. Here, a process for preparing the laminate A that is a raw material for the plurality of magnetic pieces 131 is the same as the above-described process and thus repeated description will be omitted.

First, a process of separating the laminate A into the plurality of magnetic pieces 131 will be described with reference to FIG. 12.

Figure 12A:
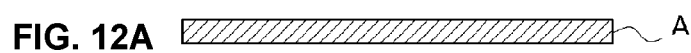
Figure 12B:
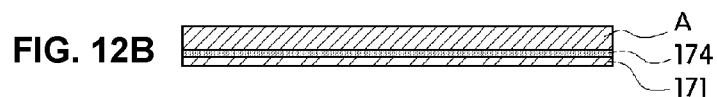
Figure 12C:
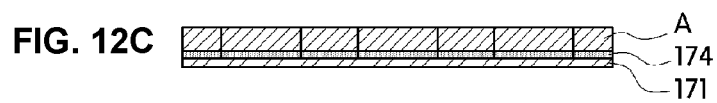

The plate-shaped laminate A having a predetermined area is prepared, and then a first carrier film 171 is attached to one surface of the laminate A via the adhesive layer 174 (see FIGS. 12a and 12b).

Figure 12D:
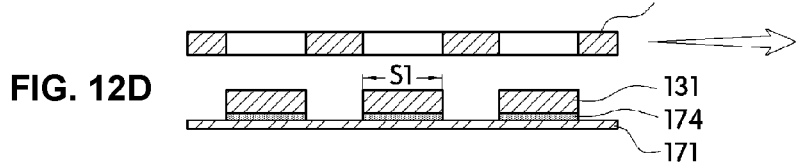

Next, the plate-shaped laminate A attached to one surface of the first carrier film 171 is separated into the plurality of magnetic pieces 131 through a punching process (see FIG. 12C), and a remaining portion A' except for the plurality of magnetic pieces 131 is removed from the first carrier film 171 (see FIG. 12D).

Thereby, the separated plurality of magnetic pieces 131 each having a constant size with a predetermined area (hereinafter, referred to as a 'first area S1') remain on the one surface of the first carrier film 171 while they are arranged at regular intervals, so that the plurality of magnetic pieces 131 may maintain an aligned state by being kept attached to the first carrier film 171 through the adhesive layer 174.

Here, when the release film 132 of FIG. 5B is attached to the uppermost side of the laminate A before punching the plate-shaped laminate A, the punching process may be performed after the release film is removed, or performed in a state in which the release film is attached.

Next, a process of separating the plate-shaped film member B into the plurality of protective films 134 will be described with reference to FIG. 13. Here, a fluorine resin-based film such as a PET film, a PP film, or a PTFE film may be used as the film member B.

Figure 13A:
Figure 13B:
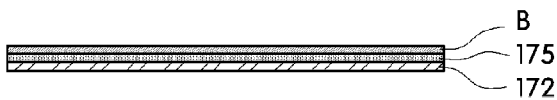
Figure 13C:
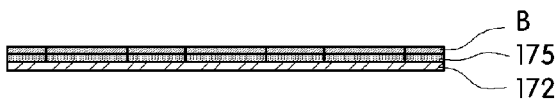

First, the plate-shaped film member B having a predetermined area is prepared, and then a second carrier film 172 is attached to one surface of the film member B via the adhesive layer 175 (see FIGS. 13a and 13b). Here, a double-sided tape having an adhesive applied to both surfaces of a base substance may be used as the adhesive layer 175.

Figure 13D:
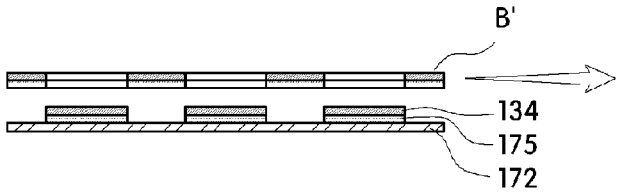

Next, the plate-shaped film member B attached to one surface of the second carrier film 172 is separated into the plurality of protective films 134 through a punching process (see FIG. 13C), and a remaining portion B' except for the plurality of protective films 134 is removed from the second carrier film 172 (see FIG. 13D).

Thereby, the separated plurality of protective films 134 each having a constant size with a second area S2 remain on one surface of the second carrier film 172 while they are arranged at regular intervals, so that the plurality of protective films 134 may maintain an aligned state by being kept attached to the second carrier film 172 through the adhesive layer 175.

At this time, the plurality of protective films 134 are punched to have a wider area than that of the upper surface of the magnetic piece 131. That is, the second area S2 is provided to have a wider area than the first area S1, and a portion of the second area S2 that exceeds the first area S1 may be provided to have a width that is 1 to 3 times greater than the thickness of the magnetic piece 131, and preferably, to have a width that is 1 to 2.5 times greater than the thickness of the magnetic piece 131.

Figure 13E:
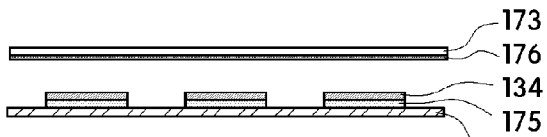
Figure 13F:
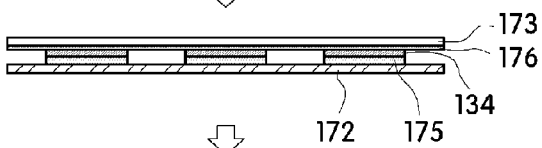

Next, a third carrier film 173 with a predetermined area which has an adhesive layer 176 provided on one surface thereof is attached to the plurality of protective films 134 so as to simultaneously cover the plurality of protective films 134 (see FIGS. 13e and 13f).

Figure 13G:
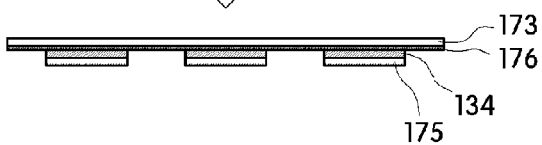

Next, the second carrier film 172 disposed at the opposite side of the third carrier film 173 with respect to the plurality of protective films 134 is removed (see FIG. 13G). At this time, only the second carrier film 172 is removed so that the adhesive layer 175 may be maintained on one surface of the plurality of protective films 34 without being removed.

Next, the first carrier film 171 and the third carrier film 173 are disposed so that the plurality of magnetic pieces 131 and the plurality of protective films 134 face each other (see FIG. 14A), and then the first carrier film 171 and the third carrier film 173 are combined with each other (see FIG. 14B). At this time, since the adhesive layer 175 is attached to one surface of the protective film 134, the plurality of magnetic pieces 131 and the plurality of protective films 134 are attached to each other via the adhesive layer 175.

Next, the third carrier film 173 is removed so that the protective films 134 that individually cover the upper surfaces of the magnetic pieces 131 may be exposed to the outside (see FIG. 14C).

Finally, when the plurality of magnetic pieces 131 are attached to the one surface of the first carrier film 171 and the first carrier film 171 is pressed through a rolling process in a state in which the protective films 134 are respectively attached to the upper surfaces of the plurality of magnetic pieces 131, each of the protective films 134 is squeezed by a pressing force to surround the side surface of the magnetic piece 131, and a portion of the protective film 134 that exceeds the first area S1 is completely adhered to the side surface of the magnetic piece 131 through the adhesive layer 175 so that the final attractor 230 is completed (see FIG. 14D).

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An attractor for PMA wireless charging type wireless power reception module, which is provided in a PMA wireless charging type wireless power reception module, changes a path of magnetic flux by inducing a part of a magnetic force line generated in a permanent magnet of a wireless power transmission module when the wireless power reception module approaches the wireless power transmission module, and induces a change in a voltage value in a hall sensor provided in the wireless power transmission module to satisfy an operation start condition of the wireless power transmission module, the attractor comprising:

a thin magnetic piece that includes a magnetic substance whose saturation magnetic flux density is 0.5 tesla or more so that an amount of the change in the voltage value of the hall sensor satisfies the operation start condition of the wireless power transmission module in an aligned state in which the wireless power reception module and the wireless power transmission module are aligned and even in a non-aligned state in which the wireless power reception module and the wireless power transmission module are not aligned within a non-alignment region with a predetermined area including the aligned state;

wherein the aligned state is a state in which a center point of the thin magnetic piece is located directly above a center point of the permanent magnet, and the non-aligned state is a state in which the center point of the thin magnetic piece is not located directly above the center point of the permanent magnet while being located in an upper portion within the non-alignment region, wherein the non-alignment region is an inner region corresponding to a cross-sectional area of the permanent magnet with respect to a center point of the permanent magnet.

2. The attractor for PMA wireless charging type wireless power reception module of claim 1, wherein the non-alignment region is a region within a radius of 8 mm with respect to a center point of the permanent magnet provided in the wireless power transmission module.

3. The attractor for PMA wireless charging type wireless power reception module of claim 1, wherein the magnetic substance includes a ribbon sheet including at least one of an amorphous alloy and a nanocrystalline alloy or silicon steel.

4. The attractor for PMA wireless charging type wireless power reception module of claim 1, wherein the thin magnetic piece is formed to have the same size as that of a central space portion of an inner antenna pattern provided in the wireless power reception module.

5. The attractor for PMA wireless charging type wireless power reception module of claim 1, wherein the thin magnetic piece is formed with a thickness of 50 μm to 200 μm.

6. The attractor for PMA wireless charging type wireless power reception module of claim 5, wherein the thin magnetic piece is formed with a thickness of 100 μm to 150 μm.

7. The attractor for PMA wireless charging type wireless power reception module of claim 1, wherein the thin magnetic piece is formed such that a plurality of ribbon sheets including at least one of an amorphous alloy and a nanocrystalline alloy are composed of multiple layers.

8. The attractor for PMA wireless charging type wireless power reception module of claim 7, wherein a bonding member including a nonconductive component is interposed between the ribbon sheets.

9. The attractor for PMA wireless charging type wireless power reception module of claim 7, wherein the thin magnetic piece is formed such that the ribbon sheets are composed of three to eight layers.

10. The attractor for PMA wireless charging type wireless power reception module of claim 7, wherein the ribbon sheets are separated into a plurality of pieces and gaps between the separated pieces are partially or totally insulated through a bonding member.

11. The attractor for PMA wireless charging type wireless power reception module of claim 10, wherein each of the separated plurality of pieces has an irregular shape.

12. The attractor for PMA wireless charging type wireless power reception module of claim 1, wherein the thin magnetic piece includes a minute piece separation preventing and oxidization preventing member so that particles or minute pieces are prevented from being separated from a side surface of the magnetic piece or the side surface is prevented from being oxidized.

13. The attractor for PMA wireless charging type wireless power reception module of claim 12, wherein the minute piece separation preventing and oxidization preventing member is a protective film.

14. The attractor for PMA wireless charging type wireless power reception module of claim 12, wherein the minute piece separation preventing and oxidization preventing member is a coating layer having adhesiveness.

15. A PMA wireless charging type wireless power reception module comprising:
an antenna unit that includes at least one antenna;
a magnetic field shielding sheet that shields a magnetic field generated by a wireless signal of the antenna unit; and
the attractor described in claim 1, which is disposed between the antenna unit and the magnetic field shielding sheet, changes a path of magnetic flux by inducing a part of a magnetic force line generated in a permanent magnet of a wireless power transmission module when the wireless power reception module approaches the wireless power transmission module, and induces a change in a voltage value in a hall sensor provided in the wireless power transmission module to satisfy an operation start condition of the wireless power transmission module.

16. The PMA wireless charging type wireless power reception module of claim 15, wherein the antenna unit is a combo type including at least two antennas of a wireless power transfer antenna, an MST antenna, and an NFC antenna.

17. The PMA wireless charging type wireless power reception module of claim 15, wherein a total thickness of the wireless power reception module is 0.2 mm to 0.5 mm.

* * * * *